(12) United States Patent
Li

(10) Patent No.: US 12,439,355 B2
(45) Date of Patent: Oct. 7, 2025

(54) RADIO RECEIVER SYNCHRONIZATION

(71) Applicant: Nordic Semiconductor ASA, Trondheim (NO)

(72) Inventor: Wei Li, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 606 days.

(21) Appl. No.: 17/737,672

(22) Filed: May 5, 2022

(65) Prior Publication Data

US 2022/0377690 A1    Nov. 24, 2022

(30) Foreign Application Priority Data

May 6, 2021    (GB) .................................. 2106478.7

(51) Int. Cl.
*H04W 56/00*    (2009.01)
(52) U.S. Cl.
CPC ....... *H04W 56/005* (2013.01); *H04W 56/001* (2013.01); *H04W 56/003* (2013.01)
(58) Field of Classification Search
None
See application file for complete search history.

(56) References Cited

U.S. PATENT DOCUMENTS

| | | |
|---|---|---|
| 9,107,153 B1 | 8/2015 | Lin et al. |
| 2004/0170237 A1 | 9/2004 | Chadha et al. |
| 2007/0104297 A1 | 5/2007 | Gorday |
| 2008/0075212 A1 | 3/2008 | Chun et al. |

(Continued)

FOREIGN PATENT DOCUMENTS

| | | |
|---|---|---|
| CN | 1677909 A | 10/2005 |
| CN | 109802912 A | 5/2019 |

(Continued)

OTHER PUBLICATIONS

U.S. Appl. No. 17/736,007, filed May 3, 2022, Wichlund.

(Continued)

*Primary Examiner* — Scott M Sciacca
(74) *Attorney, Agent, or Firm* — Klarquist Sparkman, LLP

(57) ABSTRACT

A radio apparatus is configured to correlate signal data with stored synchronization data to generate synchronization correlation data. The signal data represents a received radio-frequency signal that encodes a data frame having a synchronization preamble comprising a plurality of instances of a predetermined synchronization sequence. The stored synchronization data represents the predetermined synchronization sequence. The synchronization correlation data is generated by correlating signal data representing the synchronization preamble with the stored synchronization data. While generating the synchronization correlation data, the radio apparatus identifies a first set of one or more peaks in the synchronization correlation data, and determines first synchronization information from the first set of one or more peaks. After generating more of the synchronization correlation data, the radio apparatus identifies a second set of one or more peaks in the synchronization correlation data, and determines second synchronization information from the second set of one or more peaks.

19 Claims, 7 Drawing Sheets

(56) References Cited

U.S. PATENT DOCUMENTS

| | | |
|---|---|---|
| 2018/0212749 A1 | 7/2018 | Au Yeung et al. |
| 2019/0109698 A1 | 4/2019 | Laugeois |
| 2019/0238309 A1 | 8/2019 | Fort |
| 2019/0260628 A1* | 8/2019 | Lin .................... H04L 27/2675 |
| 2019/0349021 A1* | 11/2019 | Li ...................... H04B 1/70755 |
| 2021/0099329 A1* | 4/2021 | Hellfajer ............. H04L 27/2657 |

FOREIGN PATENT DOCUMENTS

| | | |
|---|---|---|
| CN | 109952750 A | 6/2019 |
| EP | 1 414 208 A1 | 4/2004 |
| WO | WO 2014/167318 A2 | 10/2014 |
| WO | WO 2015/189584 A1 | 12/2015 |
| WO | WO 2017/103557 A1 | 6/2017 |
| WO | WO 2018/104708 A1 | 6/2018 |

OTHER PUBLICATIONS

IPO Combined Search and Examination Report under Sections 17 and 18(3) for GB2106478.7, dated Sep. 22, 2021, 7 pages.
IPO Search Report under Section 17 for GB2106476.1, dated Sep. 22, 2021, 4 pages.
Extended European Search Report for European Application No. 22171913.1, mailed Nov. 23, 2022, 8 pages.

* cited by examiner

RADIO RECEIVER SYNCHRONIZATION

CROSS REFERENCE TO RELATED APPLICATION

This application claims priority from Great Britain Application No. 2106478.7, filed May 6, 2021, which application is incorporated herein by reference in its entirety.

FIELD

This invention relates to the synchronization of radio receivers.

BACKGROUND

For a radio receiver to be able to decode incoming radio data packets reliably, accurate synchronization is required, both at the symbol level (i.e. to identify the timing of the symbols within a data packet) and at the frame/packet level (i.e. to identify the start of the packet). Better synchronization will generally lead to greater receiver sensitivity.

A non-coherent radio receiver can determine timing-synchronization information by performing correlation operations on incoming signals. Many radio protocols define fixed preamble sequences that enable efficient frame and symbol synchronization by causing a radio transmitter to transmit a known modulated waveform at the start of each packet. A radio receiver can them receive this waveform and use its arrival to determine frame and symbol timing information. In some protocols, the preamble sequence contains a repeated pattern, which can support the use of more compact or efficient correlators in the radio receiver, as the correlator need only correlate the received signal against a single unit of the repeated pattern, rather than against the whole preamble sequence.

However, reliably obtaining fast and accurate synchronization can be challenging, especially over noisy channels. Additionally, any discrepancy between a transmission frequency used by the transmitter device and a reference frequency used by the receiver device when downmixing the incoming radio signals can also make accurate synchronization harder. Such frequency offsets may arise due to manufacturing tolerances and varying environmental conditions.

A radio receiver may determine frequency-synchronization information, such as a carrier frequency offset estimate, by comparing frequency or phase information obtained from an incoming radio signal with a signal from a local oscillator. It may then use this information to correct for a frequency offset when receiving the radio signal.

WO 2017/103557 and WO 2018/104708, by the present applicant, describe synchronization procedures that can be used when receiving a synchronization preamble containing a repeated sync-word sequence. When correlating against such a sync word, a successful synchronization event is declared once a set of above-threshold correlation peaks, spaced apart in time by amounts corresponding to the length of the sync word plus or minus a noise error margin reaches a threshold count. Symbol timing synchronization information (strobe timing) is then determined from the set of peaks, for performing symbol timing recovery, and a frequency offset estimate is also determined, for applying carrier frequency offset compensation.

However, such an approach has been found to result in undesirable synchronization performance under some conditions. Embodiments of the present invention therefore seek to provide an improved approach to synchronizing a radio receiver.

SUMMARY

From a first aspect, the invention provides a radio apparatus configured:
to correlate signal data with stored synchronization data to generate synchronization correlation data, wherein the signal data represents a received radio-frequency signal that encodes a data frame having a synchronization preamble comprising a plurality of instances of a predetermined synchronization sequence, wherein the stored synchronization data represents the predetermined synchronization sequence, and wherein the synchronization correlation data is generated by correlating signal data representing the synchronization preamble with the stored synchronization data;
while generating the synchronization correlation data, to identify a first set of one or more peaks in the synchronization correlation data, and to determine first synchronization information for the radio apparatus from the first set of one or more peaks; and
after generating more of the synchronization correlation data, to identify a second set of one or more peaks in the synchronization correlation data, and to determine second synchronization information for the radio apparatus from the second set of one or more peaks.

From a second aspect, the invention provides a method of synchronizing a radio apparatus, the method comprising:
correlating signal data with stored synchronization data to generate synchronization correlation data, wherein the signal data represents a received radio-frequency signal that encodes a data frame having a synchronization preamble comprising a plurality of instances of a predetermined synchronization sequence, wherein the stored synchronization data represents the predetermined synchronization sequence, and wherein the synchronization correlation data is generated by correlating signal data representing the synchronization preamble with the stored synchronization data;
while generating the synchronization correlation data, identifying a first set of one or more peaks in the synchronization correlation data, and determining first synchronization information for the radio apparatus from the first set of one or more peaks; and
after generating more of the synchronization correlation data, identifying a second set of one or more peaks in the synchronization correlation data, and determining second synchronization information for the radio apparatus from the second set of one or more peaks.

Thus it will be seen that, in accordance with embodiments of the invention, synchronization information is determined from the synchronization correlation data, generated from the synchronization preamble, once, and then further (e.g. updated) synchronization information can be generated (when any necessary conditions are met), as more correlation data becomes available. This advantageously allows embodiments to obtain initial synchronization information quickly after starting to receive and process the synchronization preamble, while also facilitating a more reliable synchronization by also determining additional synchronization information after a larger portion of the synchronization preamble has been received and processed. In this way, it can be possible for embodiments to synchronize both accurately and reliably, without having to trade off accuracy against robustness (e.g. robustness against the possibility of a failed frame detection).

The first synchronization information may comprise timing-synchronization information (e.g. symbol timing information) and/or frequency-synchronization information (e.g. a frequency offset estimate, which may be a carrier-frequency offset estimate). The second synchronization information may comprise timing-synchronization information (e.g. symbol timing information) and/or frequency-synchronization information (e.g. a frequency offset estimate).

This can be contrasted with naïve approaches, such as those described in WO 2017/103557 and WO 2018/104708, which simply declare synchronization as finished as soon as a validly-spaced set of peaks, of the required quantity, is detected, and then determine timing- and frequency-synchronization information once, based on every peak in this set. As explained in more detail below, if the correlation data contains spurious peaks which nevertheless conform to an expected timing pattern, such naïve approaches can result in slower synchronization, or less accurate synchronization, or even a failure to synchronize at all, resulting in packet errors or losses.

By continuing potentially to identify more peaks than required for determining the first synchronization information, embodiments of the present invention can lead to better receiver sensitivity, with a lower risk of inaccurate or failed synchronization, even when the correlation data contains spurious peaks.

It will be appreciated that not every signal received by radio apparatus embodying the invention will necessarily be suitable for determining both initial and updated synchronization information; however, the radio apparatus is configured for determining such information as and when a suitable signal is received by the apparatus.

Embodiments may receive the radio-frequency (RF) signal, which may be a radio signal or an electrical representation of a radio signal. The radio apparatus may comprise a radio receiver for receiving the RF signal as a radio signal—e.g. for receiving IEEE 802.15.4 radio signals. The radio apparatus may be configured to generate the signal data from the received RF signal, e.g. using an analog-to-digital converter to generate a time series of complex sample values. The synchronization correlation data may be generated while the radio apparatus is receiving the RF signal—i.e. in real-time. The first and/or second synchronization information may be determined before the radio apparatus has finished receiving the synchronization preamble of the RF signal. As with the first synchronization information, the second synchronization information may be determined while the radio apparatus is still generating synchronization correlation data from the synchronization preamble.

Each identified set of peaks may comprise a single peak or a plurality of peaks.

The first set of peaks may be identified from a first portion of the synchronization correlation data. The second set of peaks may be identified from a second portion of the synchronization correlation data, which may include some or all of the first portion. The second set of peaks may, in some embodiments and/or for some RF signals, include one or more of the peaks of the first set of peaks, however this may not always be the case.

The radio apparatus may be configured to use the first synchronization information when receiving at least part of the RF signal, and to use the second synchronization information when receiving at least part of the RF signal. These respective parts may be distinct parts or they may overlap partly or completely. The radio apparatus may be configured, in particular, to use the first synchronization information for synchronizing the receiving, by the apparatus, of at least a part of the synchronization preamble of the RF signal. It may be configured to use the second synchronization information for synchronizing the receiving, by the apparatus, of at least a part of the synchronization preamble of the RF signal.

The first set of peaks may be determined at a first time, and the second set of peaks may be determined at a second time, later than the first time.

In some embodiments, the first synchronization information comprises timing-synchronization information (e.g. a first strobe time value) and the second synchronization information comprises updated timing-synchronization information (e.g. a second strobe time value).

In some embodiments, the first synchronization information comprises frequency-synchronization information (e.g. a first frequency offset estimate) and the second synchronization information comprises updated frequency-synchronization information (e.g. a second frequency offset estimate).

In some embodiments, the first synchronization information comprises timing-synchronization information and the second synchronization information comprises frequency-synchronization information. In some such embodiments, for at least some received signals, the first set of peaks may be smaller than the second set of peaks (e.g. containing three peaks vs five peaks, which may or may not include the three peaks of the first set). In this way, accurate frequency-synchronization information can be determined based on more peaks, without the receiver being configured in a way that could reduce the probability of a successful timing synchronization by delaying the generating of the timing-synchronization information until the same number of peaks has been identified. In some such embodiments, the first information may further comprise frequency-synchronization information, with the second synchronization information comprising updated frequency synchronization information.

Further synchronization information for the radio apparatus may be determined from one or more further sets of one or more peaks (which may at least partly overlap with the first and/or second sets).

The radio apparatus may be configured to use the first and/or second synchronization information in a frequency-offset compensation process. It may use the first and/or second synchronization information to rotate the signal data—e.g. to rotate samples representative of a portion of the signal data received or generated after the respective synchronization information is determined. The apparatus may comprise a frequency offset compensation unit, which may comprise a CORDIC (coordinate rotation digital computer), and may be configured to pass the first and/or second synchronization information to the frequency offset compensation unit.

The radio apparatus may comprise a symbol detector for detecting symbols from the signal data. It may be configured to use the first and/or second synchronization information to synchronize the symbol detector. It may be configured to pass the first and/or second synchronization information to the detector. It may use the first and/or second synchronization information to synchronize the symbol detector for detecting symbols in a portion of the signal data received or generated after the respective synchronization information is determined, which may include one or more symbols of the synchronization preamble and/or one or more symbols of message data of the data frame.

The radio apparatus may be configured to accumulate (i.e. combine) frequency-synchronization information. It may be configured to accumulate frequency-synchronization information determined from respective peaks or respective sets of peaks (which may be distinct or overlapping sets of peaks) e.g. accumulating a plurality of frequency-offset estimates. The accumulating may comprise calculating a coherent average (e.g. a mean), from the plurality of sets of information. The radio apparatus may then use the accumulated information (e.g. an accumulated or average frequency offset estimate) for synchronizing the reception of at least part of the RF signal.

In addition or as an alternative to accumulating frequency-synchronization information, in some embodiments the radio apparatus may select frequency-synchronization information (e.g. a single frequency offset estimate), determined from one peak or from one set of peaks, from a larger quantity of frequency-synchronization information (e.g. from a plurality of frequency offset estimates) determined from a plurality of respective peaks or respective sets of peaks (which may be distinct or overlapping sets of peaks). It may use any appropriate selection criterion. The radio apparatus may then use the selected information (e.g. the selected frequency offset estimate) for synchronizing the reception of at least part of the RF signal.

In some embodiments, the radio apparatus may be configured to determine whether later-determined synchronization information is to replace earlier-determined synchronization information. If it determines that it should replace earlier information, it may use the later-determined synchronization information for receiving the RF signal. If it determines that it should not replace earlier-determined synchronization information, it may discard the later-determined synchronization information (e.g. when the information is timing-synchronization information) or it may accumulate the later-determined synchronization information with the earlier-determined information (e.g. when the information is frequency-synchronization information). It may be configured to accumulate (i.e. combine) later-determined synchronization information with earlier-determined synchronization information (e.g. by an averaging operation), to generate accumulated synchronization information, which it may use for receiving the RF signal.

The apparatus may generate the synchronization correlation data over time, e.g. as a time series of correlation values (e.g. correlation samples). Each correlation value may have an associated time value, which may be a sample index or a time stamp.

Timing-synchronization information may be determined from time values associated with the peaks of the first and/or second subset. Frequency-synchronization information may be determined from phases of the correlation values associated with the peaks of the first and/or second subset.

The apparatus may detect peaks within the synchronization correlation data as the synchronization correlation data is generated. It may determine updated synchronization information in response to detecting a new peak in the synchronization correlation data, for at least one or more peaks. In some embodiments it may perform a peak analysis process every time a new peak is detected, for at least a plurality of peaks in the correlation data. Each of the sets of one or more peaks may be identified by performing the peak-analysis process on the synchronization correlation data—e.g. on a set of one or more successive correlation sample values. Performing the process on a plurality of successive samples (e.g. two or three samples), rather than just one, may be advantageous in some embodiments, e.g. for reducing timing errors.

The peak analysis process may comprise determining whether a new peak satisfies a qualifying condition for inclusion in a set of peaks for determining synchronization information for the radio apparatus (referred to below as a qualifying peak). The qualifying condition may comprise one or more of: a magnitude condition, a timing condition, and a symbol-detection condition. Significantly, in preferred embodiments, the qualifying condition preferably does not impose a fixed minimum number of qualifying peaks to have been detected before a new peak may be used for determining synchronization information.

A magnitude criterion may require a peak to be associated with a correlation value in the synchronization correlation data having an absolute value (i.e. a magnitude) that is greater than (which may include being greater than or equal to) a threshold. The threshold may be constant or it may be dynamic. It may change over a duration of the synchronization preamble of the data frame. In some embodiments, the threshold depends on the correlation values of one or more peaks already identified in the synchronization correlation data. The threshold may, at least under some conditions, be determined as the maximum of a predetermined constant threshold and a variable threshold, wherein the variable threshold may be the maximum of the absolute values of all the correlation values of all qualifying peaks already identified in the synchronization correlation data. Such a threshold condition may be required to be met in order to determine that later-determined synchronization information is to replace earlier-determined synchronization information. A low threshold condition, such as just the predetermined constant threshold, may be required to be met in order to accumulate the later-determined synchronization information. More generally, the apparatus may require a first threshold condition to be met in order to accumulate synchronization information, and a second (e.g. stricter) threshold condition to be met in order to replace synchronization information. This can be useful because replacing synchronization information, especially when it is timing-synchronization information, may have a more significant impact on the reception of the radio signal (e.g. having a higher chance of a failed frame detection if it is incorrect), compared with merely accumulating the new information with earlier information, and so require more stringent conditions before a peak is used in this way.

A timing condition may require a peak (or a correlation value corresponding to the peak) to be separated from an earlier peak by a time interval that corresponds to the duration of the predetermined synchronization sequence—e.g. that is an integer multiple of said duration, optionally within a predetermined margin for jitter (e.g. +/− one or two sample periods, or +/−1%). In this way, peaks that are unlikely to arise due to the preamble sequence may potentially be excluded. However, in some embodiments, the timing condition may be used to identify one or more peaks that is not separated from an earlier qualifying peak by such a time interval—i.e. that is spaced away by more than the predetermined margin. This may be used to determine whether to replace earlier-determined timing synchronization information with later-determined timing synchronization information. This may be useful for avoiding a detector trying to use an early spurious peak to set symbol timing for decoding data from the data frame, by allowing a later true peak to override the spurious peak. This may be applied in combination with a magnitude criterion as described above.

A symbol-detection condition may use a symbol detector to determine whether a peak is consistent with a symbol (e.g. bit or multi-bit word) of the predetermined synchronization sequence. In some embodiments, the synchronization sequence may comprise a single symbol (e.g. four-bit word), which may be spread using a chip sequence. The receiver may use the detector to determine whether the correlation value associated with a peak corresponds to a sample from the single symbol. The receiver may drop the data frame if the symbol-detection condition is not met. This may improve efficiency. The receiver may use the symbol detector for determining (optionally in combination with a magnitude and/or timing condition) whether later-determined synchronization information is to replace or be accumulated with earlier-determined synchronization information.

The receiver may use a symbol detector to detect an end of the synchronization preamble. It may use the detector to detect a start-of-frame delimiter symbol or symbols. It may generate frame synchronization information in response to such a detection.

The synchronization data may be stored in a memory of the apparatus. The stored synchronization data may comprise a series of sample values representing a baseband waveform. The stored synchronization data may correspond to a single instance of the predetermined synchronization sequence, or to a plurality of such instances. The synchronization sequence (and optionally other data) in the data frame may be encoded using a direct-sequence spread spectrum. The data frame may be modulated on the RF signal using phase-modulation, frequency-modulation, amplitude-modulation, or a combination of such modulations. It may be offset quadrature phase-shift keying (O-QPSK) modulated. In some embodiments, e.g. that use a "double" correlation operation, the synchronization data may comprise a series of values, where each value equals a first sample representative of the synchronization sequence multiplied by the complex conjugate of a second sample representative of the synchronization sequence, wherein each second sample is offset from each first sample by a fixed offset (e.g. three sample periods).

The radio apparatus may comprise a hardware correlator (i.e. comprising electrical circuitry) for correlating the signal data with the stored synchronization data. The synchronization correlation data may comprise a time series of correlation values. The correlation values may comprise phase information, e.g. being complex correlation values. The synchronization correlation data may be sampled at regular sample intervals, and thus comprise inherent timing information. The correlator may, in some embodiments, be configured to correlate the stored synchronization data with a first sample of the signal data multiplied by the complex conjugate of a second sample representative of the synchronization sequence, wherein each second sample is offset from each first sample by a fixed offset (e.g. three sample periods)—referred to herein as a "double" correlation.

Synchronization approaches described above may be particularly beneficial when the synchronization sequence is repeated several times within the preamble e.g. four, eight, ten or more times. Radio protocols such as IEEE 802.15.4 and Bluetooth Low Energy define such repetitive synchronization preambles. In some preferred embodiments, the RF signal is a IEEE 802.15.4 or Bluetooth Low Energy signal and the radio apparatus is configured to decode IEEE 802.15.4 (e.g. Zigbee or Thread) or Bluetooth Low Energy signals.

The radio apparatus may be an integrated radio apparatus—e.g., a silicon chip. (It will be appreciated that the radio apparatus may nevertheless require one or more off-chip components to be connected to the radio apparatus for it to operate, such as a power supply, antenna, crystal, discrete capacitors, discrete resistors etc.) The radio apparatus may comprise a radio transmitter.

The radio apparatus may comprise one or more processors, DSPs, logic gates, amplifiers, filters, digital components, analogues components, non-volatile memories (e.g., for storing software instructions), volatile memories, memory bus systems, peripherals, inputs, outputs, or any other appropriate electronic components. The radio apparatus may comprise circuitry for performing timing-, phase- or frequency-correction operations.

Some or all of the steps may be implemented in software, or in hardware, or in a combination of software and hardware.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
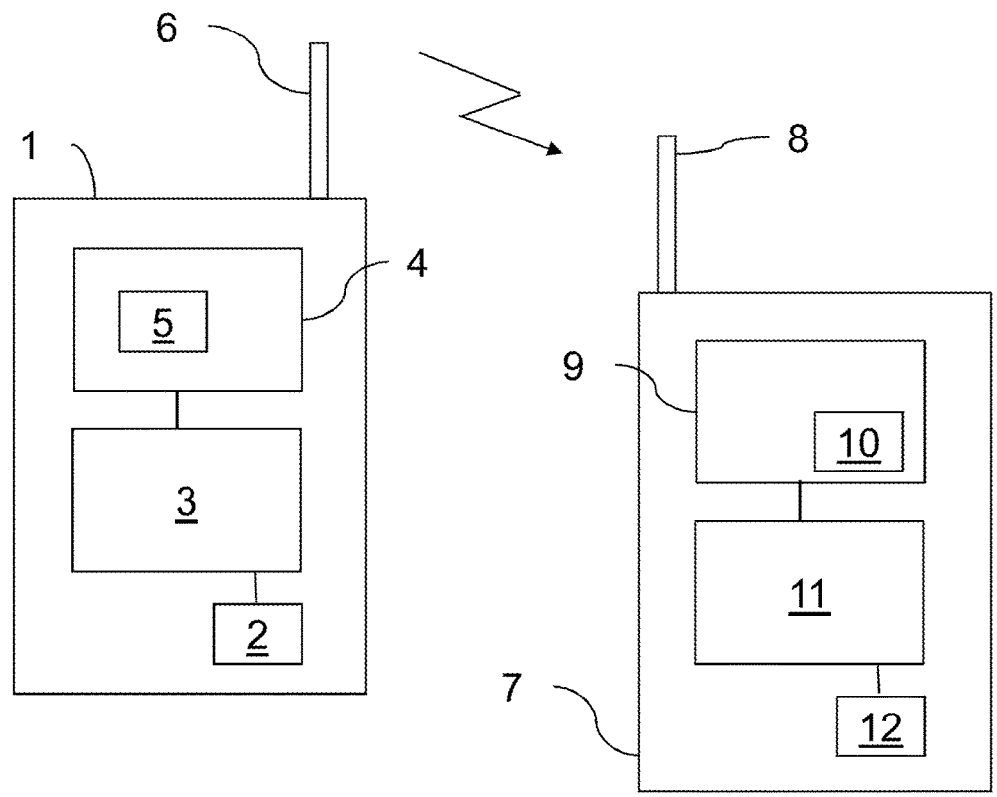
FIG. 1 is a schematic drawing of a radio communication system including a receiver embodying the invention.

FIG. 1 shows, by way of an example embodiment, a radio communication system comprising a wireless thermostat 1 which is in short-range radio communication with a wireless-network hub 7. The hub 7 is a radio receiver embodying the present invention.

The wireless thermostat 1 has a temperature sensor 2 which is connected to a microprocessor 3 (such as an ARM™ Cortex M-series). The microprocessor 3 is connected to a radio transmitter 4. The radio transmitter 4 includes an encoder 5 (among other components). The encoder 5 may be implemented by a dedicated hardware circuit, or by software executing on a processor, or by a combination of hardware and software logic. Other conventional components, such as memory, a battery, etc. are also present, but are omitted from FIG. 1 for the sake of simplicity. The microprocessor 3 and radio transmitter 4 may be integrated on a single silicon chip. The monitor 1 has a radio antenna 6, which may be integrated on such a chip or external to it.

The hub 7 has, among other conventional components (not shown), an antenna 8 which is connected to a radio receiver 9. The antenna 8 is suitable for receiving short-range radio communications from wireless-personal-area-network devices, including the wireless thermostat 1. The radio receiver 9 includes synchronization and decoding logic 10, among other components. The logic 10 may be implemented by a dedicated hardware circuit, or by software executing on a processor, or by a combination of hardware and software logic. The radio receiver 9 is connected to a microprocessor 11 (such as an ARM™ Cortex M-series), which can output data for display on a screen 12, possibly via other components, such as a further microprocessor (not shown) running an operating system and appropriate software applications.

In use, the wireless thermostat 1 receives periodic temperature readings from the temperature sensor 2. The microprocessor 3 processes the readings into a suitable format for transmission, and sends the message data to the radio transmitter 4. The radio transmitter 4 determines whether the message data can fit within a single data packet (corresponding to a single data frame), or if it must be split across two or more data packets. The encoder 5 in the radio transmitter 4 encodes part or all of the message data, e.g. using a convolution-based forward-error-correcting code, and adds any headers or other metadata to the encoded message data to create a packet payload. It then direct-sequence-spread-spectrum (DSSS)-encodes this entire payload using a fixed chip sequence. For example, each four-bit symbol might be represented by a different respective 32-bit spreading sequence. Of course, other lengths of chip sequence may be used. The transmitter 4 then prepends a synchronization word to the payload, consisting of a number repetitions of a predetermined sequence. This may be followed by a predetermined start-of-frame delimiter (SFD) and/or a payload-length header, before the data payload containing the message data. The radio transmitter 4 transmits the encoded data packet from the antenna 6, modulated on a radio-frequency carrier (e.g. a carrier in the 2.4 GHz band), using a suitable modulation scheme.

In some embodiments, the wireless thermostat 1 and hub 7 communicate using a protocol having a physical layer that implements a version of the IEEE 802.15.4 standard. They may, for example, communicate using Thread™ or ZigBee™. In some such embodiments, each 4-bit symbol is mapped onto a 32-chip spreading sequence, and packets are modulated using offset quadrature phase-shift keying (O-QPSK) operating at a data rate of 250 kb/s. Each symbol thus has a duration of 16 µs.

Figure 2:
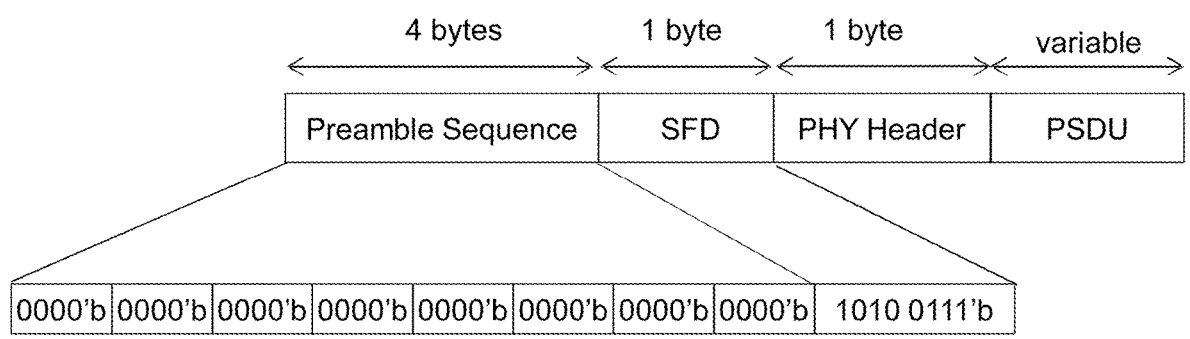
FIG. 2 is a diagram of a data packet that may be transmitted and received by the radio communication system.

FIG. 2 shows an exemplary data packet structure used in such 802.15.4 embodiments. It has a 32-bit (8-symbol) preamble synchronization sequence, followed by an 8-bit start-of-frame delimiter (SFD), an 8-bit physical-layer (PHY) header, and a variable-length PHY service data unit (PSDU) of between zero and 127 octets. The preamble sequence consists of eight instances of the zero symbol, 0000'b. After DSSS-encoding this becomes eight instances of the same 32-chip sequence. The SFD field contains the fixed two symbols 1010 0111'b (0xA7) and introduces the start of the substantive content of the frame, which starts with a variable in the PHY header that indicates the length of the PSDU and then provides the PSDU itself.

In use, the wireless-network hub 7 receives the radio data packet at the antenna 8. The radio receiver 9 down-mixes the received signal to an intermediate frequency or directly to baseband, and then samples the signal to generate a stream of complex digital samples values, representing in-phase and quadrature components of the received signal. The signal may first be filtered in the analog and/or digital domains. The receiver 9 processes the modulated digital signal using the synchronization and decoding logic 10.

The synchronization and decoding logic 10 performs non-coherent decoding. It first cross-correlates the incoming sample stream, I & Q, with stored data representing the waveform, at baseband, of a single instance of the modulated chip sequence corresponding to the synchronization symbol, 0000'b. It does this by maintaining a buffer of the most recently-generated samples, and calculating a time series of complex inner-product operations between the stored synchronization template and the currently-buffered data, thereby generating a time series of complex correlation values, Cn. It analyses the correlation values over time in order to perform symbol timing recovery and frequency offset correction. This process is explained in more detail below, with reference to FIGS. 3 to 7.

The repetitive synchronization sequence allows the synchronization and decoding logic 10 to detect and synchronize to a packet based on the separation in time between correlator matches, as well as correlator output amplitude, as described in more detail below.

The synchronization and decoding logic 10 determines the end of the preamble, and the start of the PSDU, by detecting the SFD field, thereby achieving frame (i.e. packet) synchronization. The radio receiver 9 can then decode the PSDU, using the acquired frame and symbol timing information to do so, before passing the decoded message data to the microprocessor 11 for processing.

The microprocessor 11 may process the message data in any appropriate way. In some embodiments, it may display temperature information graphically on a display screen 12 of the hub 7 for a user to see.

In some embodiments, the wireless thermostat 1 and hub 7 may be configured so that temperature message data is transferred from the wireless thermostat 1 to the hub 7 using the Thread™ or ZigBee™ specification. The wireless thermostat 1 and hub 7 may be equipped for two-way radio communication, using corresponding components as those described above for performing radio transmission in the opposite direction. However, this is not essential in all embodiments.

Figure 3:
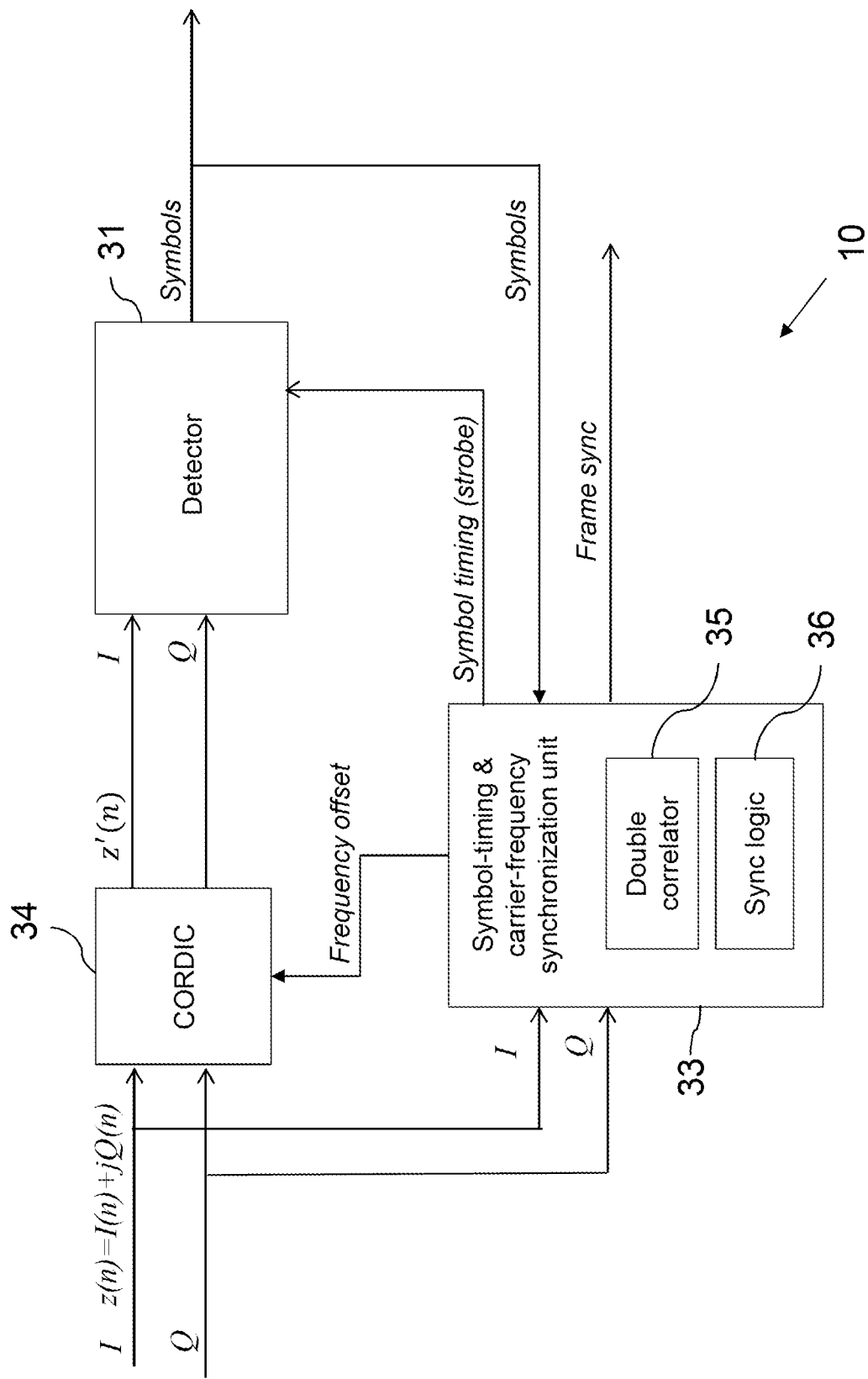
FIG. 3 is schematic drawing of synchronization and decoding logic of the radio receiver.

FIG. 3 schematically represents various digital baseband processing units implemented by the synchronization and decoding logic 10 for detecting and decoding a received data frame. Operations such as filtering and residual frequency-offset tracking are not shown, for reasons of conciseness.

Complex-valued baseband samples, I & Q, are received into a data-aided joint timing and frequency synchronization unit 33, for determining symbol and frame timing synchronization data and frequency-offset estimation data. The synchronization unit 33 is coupled to a CORDIC (coordinate rotation digital computer) unit 34, for performing carrier frequency offset (CFO) compensation on the incoming samples. The CFO-compensated complex samples then pass to a detector 31, which detectors the DSSS-encoded data symbols. The detector 31 outputs a stream of decoded symbols, in groups of four bits, B, to the microprocessor 11.

These decision symbols are also fed back to the timing- and frequency-synchronization unit 33.

FIG. 3 uses the following notation:
n=chip index;
z(n)=complex baseband samples;
z'(n)=carrier-frequency offset (CFO) compensated z(n);
pdata$_i$(k)=stored data representing the i different 32-bit DSSS chip sequences.

The timing- and frequency-synchronization unit 33 comprises a correlator 35, referred to herein as a "double" correlator 35, for performing data-aided joint timing and frequency estimation, and associated synchronization logic 36. This exploits knowledge of the data in the received symbols to cancel the effect of the modulation on the estimate of a delay-and-correlate type of carrier frequency offset estimator.

Because a repetitive synchronization word is received, additional checks on the time domain distances between successive magnitude responses can be used to filter out false detections. This means that a shorter correlator with a lower detection threshold can be used to achieve a given level of sensitivity lowering receiver complexity.

The synchronization unit 33 in FIG. 3 correlates against the repeated synchronization word in order to calculate the following cross correlation values for every incoming baseband sample, $u_n = w\,I(n) + jQ(n)$:

$$C_n = \sum_{i=0}^{L-1} [z_{n-i} z^*_{n-i-D}] d_i,$$

where the coefficients $d_i$ comprise stored synchronization data, calculated in advance, in which $d_i = p_i^* p_{i+D}$ where $p_i$ are samples corresponding to the predetermined synchronization symbol at baseband, where D is a lag which is decided at design time (e.g. eight or sixteen samples), and where L corresponds to the length of the synchronization symbol, at the sampling rate used by the logic 10.

The signal may, in some embodiments, be over-sampled and/or up-sampled, in which case the stored synchronization data may be scaled up correspondingly. The cross-correlation operation may be performed using sample-wise multiplication operations.

The synchronization unit 33 is also able to generate carrier-frequency offset estimates according to the equation:

$$\Delta \hat{f} = \frac{1}{2\pi DT} \arg\left\{ \sum_{i=0}^{L-1} [z_{n-i} z^*_{n-i-D}] d_i \right\},$$

where T is the sample period.

Assuming that the carrier frequency offset is relatively constant over D samples, this estimate provides a good estimate of the carrier-frequency offset, so long as it is sampled when the correlation is aligned with an incoming synchronization symbol—i.e. at time instants corresponding to peaks in the absolute correlation value |Cn|, or in a normalised magnitude measure such as $M_n$ given by:

$$M_n = \frac{|C_n|}{P_n},\ \text{where } P_n = \sum_{i=0}^{L-1} |z_{n-i-D}|^2.$$

Qualifying peaks in the correlation data may be determined against a magnitude threshold, as explained below. They are stored in a peak pool 60 and processed as described below, to determine what peaks to use for generating carrier frequency offset (CFO) estimates for the CORDIC unit 34 and symbol timing information (strobe time) for synchronizing the detector 31.

The CORDIC unit 34 receives frequency offset estimates from the synchronization unit 33, and uses the latest frequency offset estimate it receives to rotate subsequent incoming samples by a corresponding phase angle, to compensate for any carrier frequency offset. The resulting CFO-compensated sequence of complex baseband samples z'(n) is then passed to the detector 31.

The logic 10 may be implemented in hardware and may include a finite state machine (FSM) for orchestrating the synchronization and decoding process.

Figure 4:
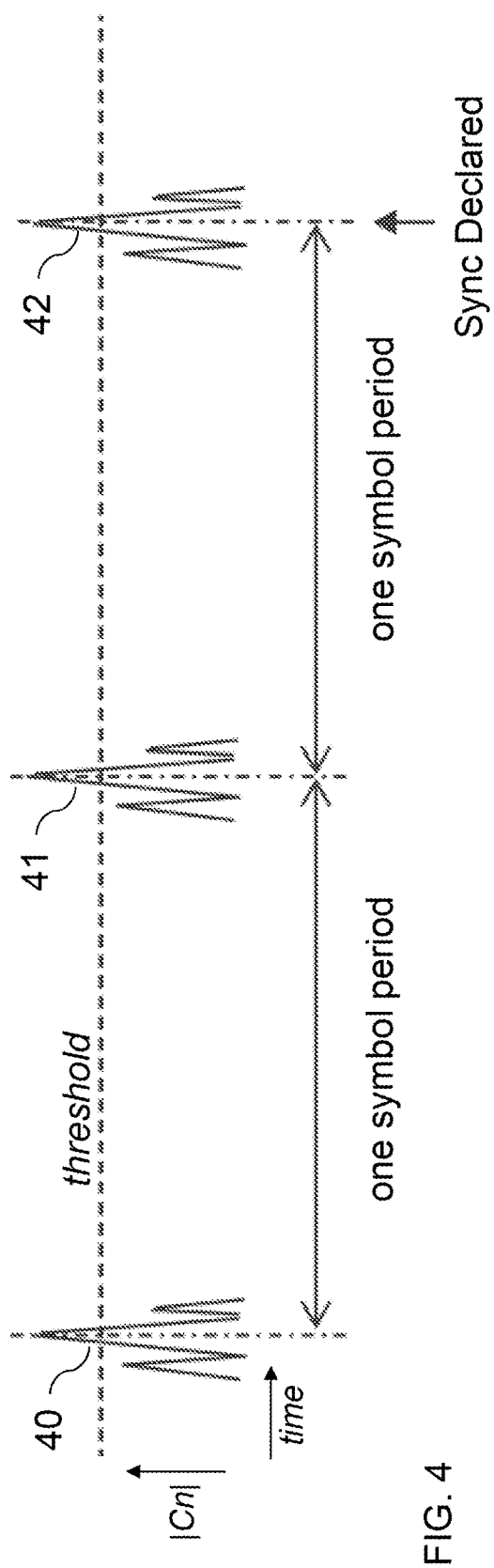
FIG. 4 is schematic graph of correlation amplitude against time in a first example scenario.
Figure 5:
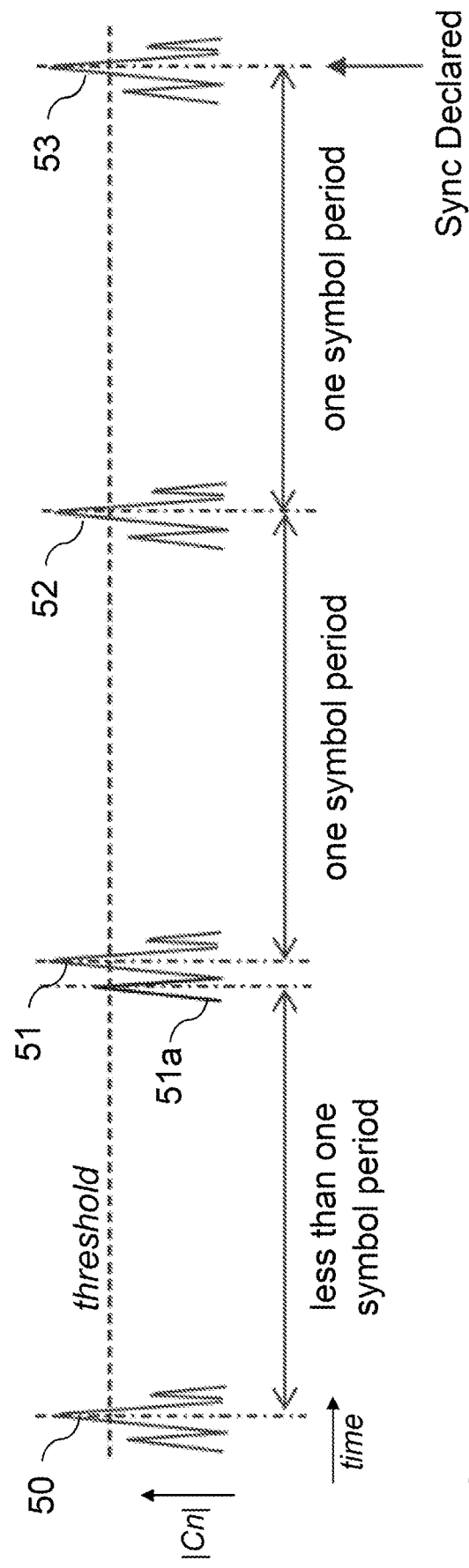
FIG. 5 is schematic graph of correlation amplitude against time in a second example scenario.

FIGS. 4 & 5 illustrate some of the challenges which can arise when using a naïve approach to synchronization, and which are addressed by embodiments as disclosed herein. They show peaks in the correlation amplitude, over time, generated by correlating incoming signals against a predetermined preamble sequence, having the form shown in FIG. 2.

A naïve approach might identify peaks above a threshold level (represented by the horizontal dashed lines in FIGS. 4 & 5) using any appropriate peak-finding algorithm, and may declare that symbol-timing synchronization has been achieved as soon as three peaks have been identified that satisfy a spacing requirement that each successive peak occurs after the preceding peak by one preamble-symbol period plus/minus a tolerance for jitter (e.g. +/−1%).

When the output is as shown in FIG. 4, in which a first peak 40, second peak 41 and third peak 42 occur exactly at the preamble-symbol spacing, this approach may work adequately.

However, the output as shown in FIG. 5 would cause synchronization problems. In this example, a second peak 51 has a sidelobe peak 51a that is above the threshold, but that occurs less than 0.95 of a symbol period after a preceding peak 50, causing both the first peak 50 and the sidelobe peak 51a to be discarded, even though the first peak 50 was a valid peak. This then delays synchronization being declared by one symbol duration, until the second peak 51, a third peak 52 and a fourth peak 53 have been identified. Delayed synchronization is undesirable in itself, but if this situation occurs several times within one packet preamble, then synchronization may fail altogether for that packet. A spurious peak could be a sidelobe of a valid peak, or any other erroneous above-threshold peak such as a peak arising due to noise.

Conversely, if three spurious peaks occur that satisfy the spacing condition, the receiver could falsely declare synchronization based on the timing of these spurious peaks, which will then not be correct and could lead to loss of the packet.

In general, if synchronization loss can be reduced, the sensitivity of a radio receiver should improve. Ideally, this would be done without unduly reducing selectivity (that is, the receiver's ability to reject signals on channels outside the desired tuned channel).

Embodiments disclosed herein therefore take a different approach. They do not declare preamble synchronization completed upon detecting a fixed number of qualifying peaks, calculating and outputting only one set of symbol-timing information and one carrier frequency offset estimate. Instead, they may apply different conditions for determining when to output symbol-synchronization information and when to output frequency offset estimates (i.e. not necessarily always at the same time). They also continue generating and processing subsequently-received synchronization-preamble correlation data, as more of the synchronization preamble is received, so to detect any further qualifying peaks, and potentially generate updated timing- and/or frequency-synchronization information, which may be more accurate.

This can potentially lead to the receiver 9 synchronizing both faster and more reliably. It may, for instance, enable better frequency-offset estimates to be calculated, by allowing CFO estimates to be calculated based on phase values determined over more than three peaks (e.g. averaged over five or more peaks), while allowing symbol timing to be determined based on a lower number of peaks (e.g. using just three peaks, if noise prevents synchronizing on more than three). This can improve the CFO estimate accuracy without reducing the probability of successful frame synchronization.

The present synchronization and decoding logic 10 therefore runs unconditionally all the way up to the detection of the SFD, rather than terminating as soon as synchronization can be declared.

More details of how this may be implemented in some exemplary embodiments will now be provided, along with simulation data that validates the approach.

802.15.4 Receiver Design Using Accumulative DouBle Correlation (ADBC)

The following description is given for an IEEE 802.15.4 receiver 9 that uses a "double" correlator ("DBC") approach, as introduced above, to accumulate frequency offset estimates repeatedly over the duration of the preamble sequence. The present approach will be referred to herein for convenience as Accumulative DouBle Correlation or "ADBC". However, it should be appreciated that the same underlying principles may be adapted for receiving different radio protocols or for use in different receiver architectures.

The double correlator 35 in the synchronization unit 33 here works together with the symbol detector 31, in a cooperative manner, in order to unlock the symbol timing configuration, even in challenging environments, such as a strong co-channel interference signal.

Assuming a sampling rate of 8 mega-samples per second (or 4 samples per chip), the analogue waveform of symbol 0 (i.e. 0000'b), which is a 32-chip sequence after spreading, and which appears eight times in the synchronization preamble of each frame, can be represented by a column vector w that consists of 128 complex samples, written as $$w = [w_0, w_1, \ldots w_{127}] \quad (1)$$

Using equation (1) and the fact that there should be zero phase difference between the phase at the beginning of the symbol and at the end of the symbol, this can be extended w to a 136 sample sequence v, i.e.

$$v = [v_0, v_1, \ldots v_{135}] \quad (2)$$
$$= [w_0, w_1, w_{127}, w_0, w_1, \ldots w_7]$$

A 128 sample vector d can be generated, whose i-th element is calculated as $$d_i = v_{i+8} v_i^* \quad (3)$$

The values of d are stored in a memory accessible by the synchronization and decoding logic 10, as stored synchronization data representative of the predetermined synchronization sequence, providing a reference waveform which will be used for symbol timing in the preamble-based synchronization process. These values may be calculated by the receiver 9 as needed, or may be precalculated and stored during manufacturing. Different values for the lag, D, other than D=8, may be used in other embodiments, depending on requirements.

The ADBC receiver 9 calculates the auto-correlation between received IQ samples $z_t$ and $z_{t-8}$, i.e. $w_t = z_t z_{t-8}^*$. As the signal data is generated from the incoming radio signal, the receiver stores the latest 128 values of $w_t$ into a 128 sample register, denoted by a column vector w. After correlating w with the reference sequence d, a ratio γ is calculated be one of two possible methods.

In a first method, γ is calculated according to $$C = \sum_{k=0}^{127} d_k w_k^* \quad (4)$$

$$\gamma = \frac{|C|}{\sqrt{\sum_{k=0}^{127} d_k d_k^* \sum_{k=0}^{127} w_k w_k^*}}$$

In a second method, γ is calculated according to $$C = \sum_{k=0}^{127} d_k w_k^* \quad (5)$$

$$\gamma = \frac{|C|}{\sqrt{\sum_{k=0}^{127} d_k d_k^*} \frac{\sum_{k=0}^{127} z_{k-8} z_{k-8}^*}{\sqrt{128}}}$$

Equation (5) can be considered as an approximation of Equation (1). Although method 2 uses an approximated calculation result, it is expected to achieve similar performance as the first method. The complexities of both methods are almost the same.

Figure 6:
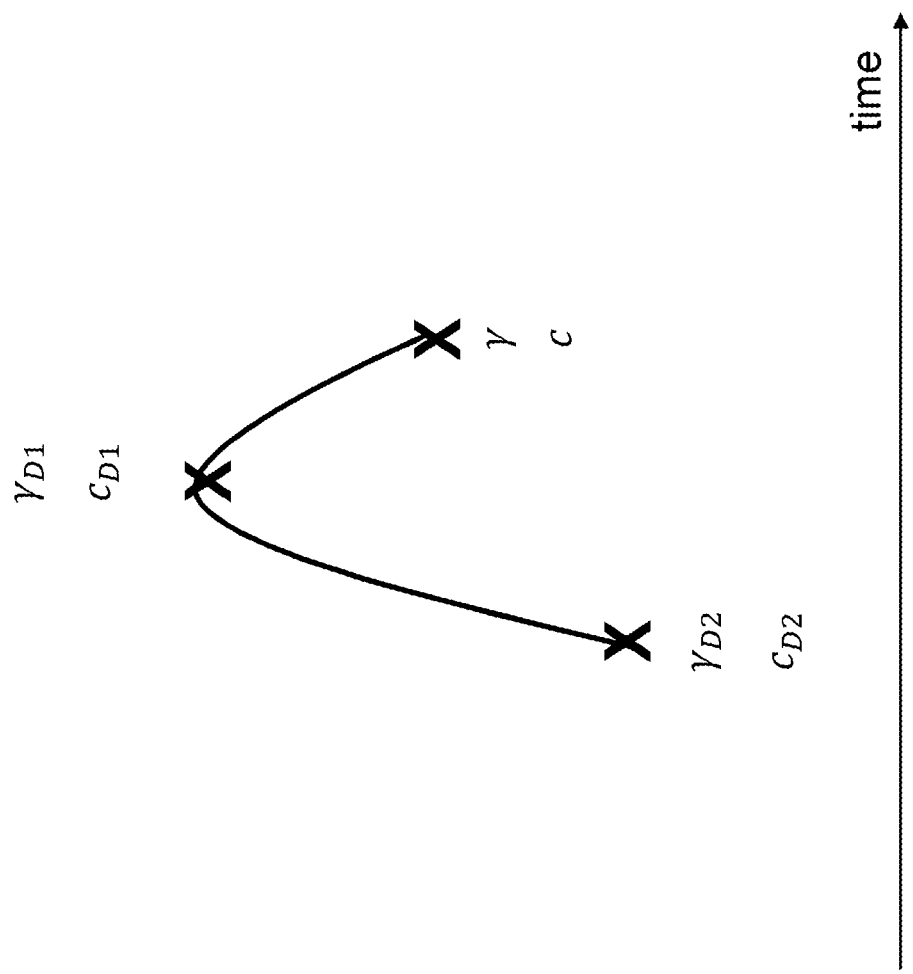
FIG. 6 is plot of magnitude against time for three correlation values to explain a principle of operation of a receiver embodying the invention.

FIG. 6 illustrates three representative successive cross-correlation samples of the correlation data generated by the double correlator 35, for aiding understanding of the synchronization procedure described below with reference to FIG. 7 and the pseudo code below. In FIG. 6, C stands for the complex correlation value, while γ is a real-valued ratio calculated according to one of Equations (4) or (5) above, or as $M_n$ further above. Sample index D1 indicates the peak in γ, while D2 indexes the sample immediately preceding the peak, and the unindexed values are the sample immediately following the peak. Considering three samples, rather than just the peak sample, can improve synchronization accuracy by allowing for possible timing errors.

Figure 7:
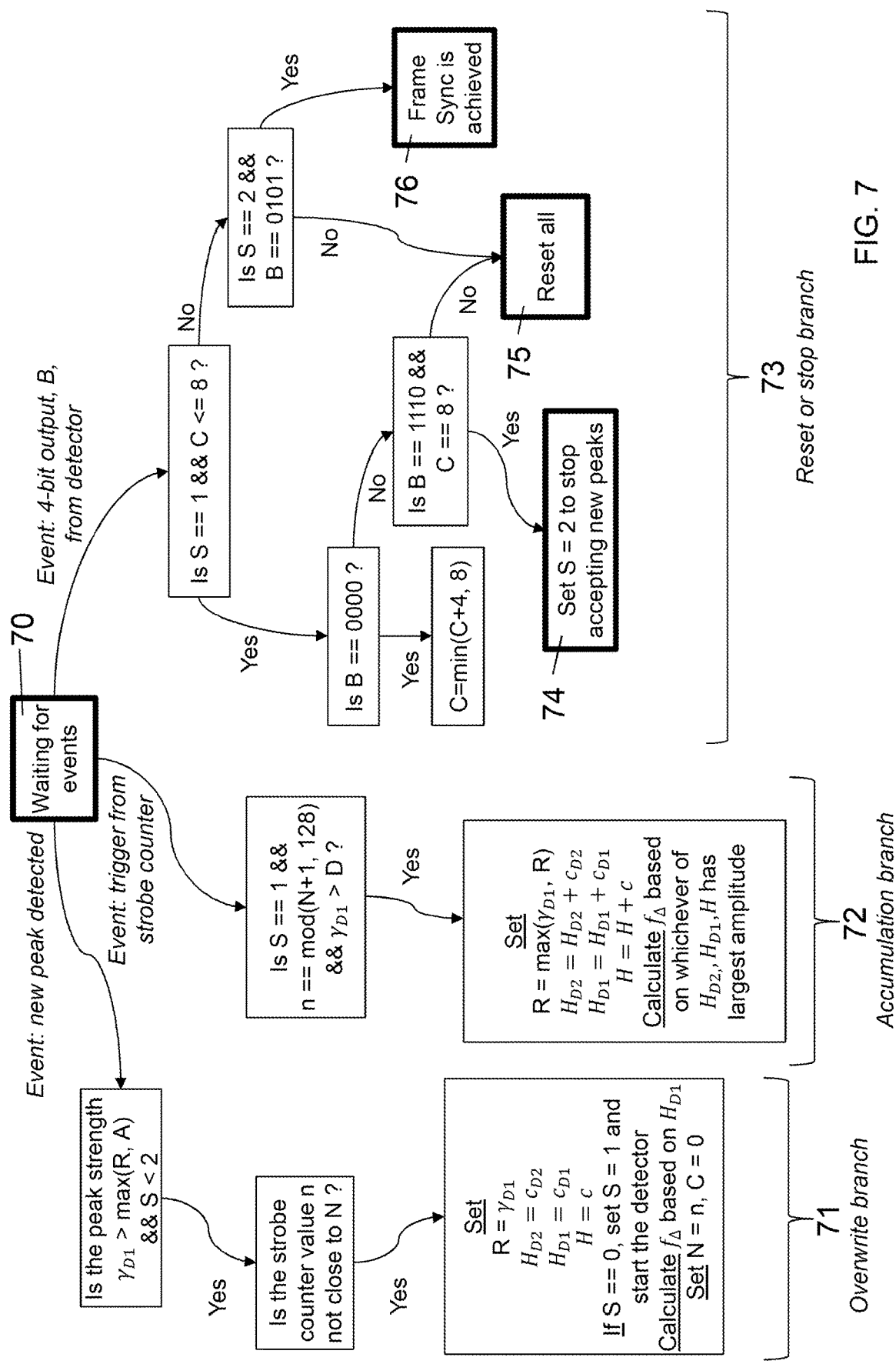
FIG. 7 is flow chart of operations carried out by a receiver performing a synchronization process embodying the invention.

FIG. 7 illustrates the main steps in the synchronization process, which may be implemented in the synchronization unit 33 by a set of hardware finite state machines (FSM), implementing the procedures shown in the pseudocode below. In variant embodiments, some or all of the steps or procedures may alternatively be implemented by software executing on a processor, or as a combination of hardware and software. For a full understanding, the pseudocode below should be read in conjunction with FIG. 7.

FIG. 7 and the pseudocode use the following variables, with the following meanings:

S: a state variable—0=IDLE; 1=accepting new peaks; 2=ignore new peaks in γ

R=$\gamma_{local}$: maximum peak strength in the past (initial value R=0)

$H_{D2}$, $H_{D1}$, H: correlation sums for CFO estimation
Δf=F: the latest CFO estimate
N: strobe offset to trigger the detector (initial value N=0)
C: number of valid bits from the detector (initial value C=0)
n: a strobe counter, n=0, . . . , 127, wrapping every 128 samples (i.e. every 4-bit symbol)
m: a symbol boundary variable
B: latest four bits, xxxx'b, output from the detector 31
$I_{DBC}$: a sync indicator indicating that correlator (DBC) 35 has raised a flag that the symbol timing achieved, meaning that the estimated symbol boundary offset is assigned to m
$I_{strobe}$: a strobe trigger indicating that a strobe signal is triggered. When n==m, $I_{strobe}$ is set to 1, otherwise 0.
$I_{invalid}$: an invalid output indicator, indicating that an invalid output is given by the detector 31 which should be ignored
$I_{sync}$: a frame sync indicator, indicating that a valid frame sync word is captured
$I_{drop1peak}$: an invalid peak indicator, indicating that the correlator (DBC) 35 should ignore the following peak due to a wrong spacing, which may be due to detecting a symbol [1110]. This allows a detection delay to be taken into account, e.g. which may arise when the detector 31 has a pipelined design.

It uses two threshold parameters, which may be configurable in some embodiments, e.g. under the control of firmware executing in the processor 11:
A: a threshold for identifying a valid peak
D: a threshold for deciding whether to accumulate the frequency offset estimate or not The process starts in an idle state (S=0) with a waiting for an event. These events may be:
i) a new peak being detected in the correlation data,
ii) a trigger from a strobe counter, n, or
iii) a 4-bit symbol being output by the detector 31.

In use, the synchronization unit 33 calculates the ratio γ for every incoming IQ sample. It performs a simple peak detection process to detect whenever three successive values of γ rise then fall, as shown in FIG. 6. This signals a peak, albeit not necessarily a peak that qualifies in strength or spacing for use in determining updated timing- and/or frequency-synchronization information.

Initially, the receiver searches for a valid correlation peak over γ to determine the starting point of a valid 802.15.4 frame.

When a new peak is detected in γ, the overwrite branch 71 is invoked. This checks if the unit 33 is accepting new peaks, and if the peak has a magnitude that is above the threshold A and also higher than any previously-identified peak. It also checks if the peak is not spaced close to (e.g. within a configurable limit of one or two samples of) an integer number of symbol widths from the last valid peak identified by the overwrite branch 71 (i.e. is not in an expected position). Assuming these checks all pass, this will detect the first peak of a new frame, but thereafter will only detect peaks in unexpected locations if they are very strong peaks. Upon detecting a qualifying peak, this branch 71 starts the detector 31. It also calculates a new frequency offset estimate, Δf (also called F in the pseudocode below), and outputs this estimate, Δf, to the CORDIC 34. It does not accumulate the frequency offset with earlier frequency offsets, but establishes a new CFO estimate Δf for the CORDIC 34, effectively "overwriting" any earlier estimate. It also outputs initial or updated symbol timing information to the detector 31, by setting N=n. If this is not the first peak of the frame, the symbol timing information will overwrite any earlier symbol timing information—either immediately or when the final frame sync is asserted. Lines 25 to 40 of the ADBC procedure, "Procedure 3", below, relate particularly to the overwrite branch 71.

A trigger from the strobe counter initiates an accumulation branch 72. This checks if the unit 33 is accepting new peaks, and if the current peak exceeds the threshold D for accumulating frequency offset estimates. It also checks if the peak is spaced an integer number of symbols, i.e. k×128 samples, away from the preceding qualifying peak. If these checks all pass, it proceeds to update the maximum peak strength variable, R, and to perform a coherent accumulation of the three correlation sample values, $C_{D2}$, $C_{D1}$, C, around the peak (see FIG. 6), with the respective initial or accumulated values from the preceding peak detection. It calculates an updated frequency offset estimate Δf for the CORDIC 34 to use, based on whichever accumulated complex correlation value has the largest magnitude (to account for any sampling timing errors). Lines 10 to 24 of the ADBC procedure, "Procedure 3", below, relate particularly to the accumulation branch 72.

By use of these branches 71, 72, the synchronization unit 33 determines symbol timing information (represented by N) and calculates initial & updated frequency offset estimates, Δf (also called Fin the pseudocode below), and symbol synchronization, based on peak amplitude & spacing alone, without requiring a fixed number of peaks to have been detected. The frequency and symbol estimates may be updated over time, assuming further qualifying new peaks are detected as the preamble is processed. The use of an adaptive threshold for detecting qualifying peaks in the overwrite branch 71 can efficiently reduce the risk that a false frame synchronization peak locks the receiver so that a real peak is lost, while also efficiently reducing the risk that a real peak is overridden by a false one.

The logic 10 uses the detector 31 to improve the synchronization accuracy compared with what the correlator 35 alone could accomplish, especially in the presence of noise or interference.

A new symbol from the detector 31 causes the "reset or stop" branch 73 to be followed. This uses the output of the symbol detector 31 to check that the preamble contains only the synchronization symbol, 0000'b, or that the SFD, 0xA7=1110 0101'b has been reached (the bits are presented here in reversed bit order, purely for implementation reasons). If the first SFD symbol is detected, the detection of new peaks is stopped 74, and the arrival of the second SFD symbol as the next-detected symbol results in the synchronization unit 33 to signal to the detector 31 and/or the microprocessor 11 that frame synchronization has been achieved 76. If another symbol is detected during the preamble, or if the first and second SFD symbols are not detected in sequence, an error is detected and the synchronization unit is reset 75.

The causes the peak searching process to restart, using the default initial values. The sync-word procedure, "Procedure 2", below, relates particularly much to the reset or stop branch 73.

The synchronization unit 33 implements three procedures that work simultaneously: a strobe-counting procedure, a synchronization word capture procedure, and an accumulative correlation procedure. The actions of each procedure will be better understood from studying the following pseudocode.

The following "strobe counting" procedure manages the strobe counter, used for determining the symbol timing information and for checking the spacing of the peaks.

---

Procedure 1: Strobe Counting FSM

---

```
 1:   procedure STROBECOUNTING
 2:       Set n ← 0
 3:       Set m ← 64
 4:       Set strobe offset variable M ← −2
 5:       Set output 4-bit symbol X ← [0000]
 6:       while a new IQ sample u_t arrives do
 7:           Calculate n ← mod(n + 1, 128)
 8:           if n == m then
 9:               if I_DBC == 1 then
10:                   I_strobe ← 1
11:               else
12:                   I_strobe ← 0
13:               end if
14:               Copy samples to the shade register
15:               Start the symbol detection
16:           else
17:               if I_DBC == 1 then
18:                   if n == mod(m − 2, 128) then
19:                       Take the output from the symbol detector and assign it to X
20:                   end if
21:               end if
22:               I_strobe ← 0
23:           end if
24:       end while
25:   end procedure
```

The following "synchronization word" procedure relates particularly to the "reset or stop" branch 73 of FIG. 7. In particular, lines 15-19 relate to the detection of symbols [1110] and [0101] of the "start of frame delimiter" SFD. If the symbol is output by the detector 31, this is signalled in line 18; and the synchronization unit 33 is reset 75 in line 19, due to the unexpected symbol.

---

Procedure 2: Sync-Word Capture

---

```
 1:   procedure FRAMESYNCWORDCAPTURE
 2:       Set N_Bit0s ← 4
 3:       Set output bit index variable l ← 0
 4:       Set 12-bit register R ← [000000000000]
 5:       Set I_invalid ← 0
 6:       while a new IQ sample u_t arrives do
 7:           if I_strobe == 1 then
 8:               if I_invalid == 0 then
 9:                   Set l ← l + 4
10:                   if I_sync == 0 then
11:                       if X == [0000] then
12:                           if l > N_Bit0s then
13:                               l ← N_Bit0s
14:                           end if
15:                       else if X == [1110] && l == N_Bit0s + 4 then
16:                           Continue
17:                       else if X == [0101] && l == N_Bit0s + 8 then
18:                           I_sync ← 1
19:                           Stop DBC
20:                       else
21:                           l ← 0
22:                           γ_Local ← γ_Config
23:                           I_DBC ← 1
24:                           I_drop1peak ← 0
25:                           H ← 0, H_D1 ← 0, H_D2 ← 0
26:                       end if
27:                   end if
28:               else
29:                   I_invalid ← 0
30:               end if
31:           end if
32:       end while
33:   end procedure
```

In the following ADBC procedure, lines 25 to 40 relates particularly the overwrite branch 71 of FIG. 7, while lines 10 to 24 relate to the accumulation branch 72.

---

Procedure 3: Accumulative Double Correlator FSM

---

```
 1:   procedure ADBC-FSM
 2:       if ADBC-FSM is enabled then
 3:           Set DBC ratio variables γ_D1 ← 0, γ_D2 ← 0, γ_Local ← γ_Config
 4:           Set DBC sum variables C ← 0, C_D1 ← 0, C_D2 ← 0
 5:           Set DBC sum history vaiables H ← 0, H_D1 ← 0, H_D2 ← 0
 6:           Set I_drop1peak ← 0
 7:           Set frequency offset estimate F ← 0
 8:           while a new u_t arrives do
 9:               Calculate the ratio γ as (4) or (5)
10:               if I_DBC == 1 && mod(m − n − M, 128) == 0 then
11:                   Find [γ_Max, p_Max] = max(γ_D2, γ_D1, γ)
12:                   if γ_Max > γ_Config && b ≤ 5 then
13:                       H ← H + C, H_D1 ← H_D1 + C_D1, H_D2 ← H_D2 + C_D2
14:                       if p_Max == 1 then
15:                           Update F based on H_D2
16:                       else if p_Max == 2 then
17:                           Update F based on H_D1
18:                       else
19:                           Update F based on H
20:                       end if
21:                       if γ_Max > γ_Local then
22:                           γ_Local ← γ_Max
23:                       end if
24:                   end if
25:               else if [γ_D1 > γ && γ_D1 ≥ γ_D2 && γ_D1 ≥ γ_Local] then
26:                   if γ_D1 > γ_Local then
27:                       if I_DBC == 0 || mod(m − n − M, 128) > 1 then
28:                           if I_drop1peak == 0 then
29:                               m ← mod(n + M, 128)
30:                               Update F based on C_D1
31:                               H ← C, H_D1 ← C_D1, H_D2 ← C_D2
32:                               γ_Local ← γ_D1
33:                               Start the detector and set I_DBC ← 1
34:                               I_drop1peak ← 1
35:                           else
36:                               I_drop1peak ← 0
37:                           end if
38:                       end if
39:                   end if
40:               end if
41:           end while
```

-continued

Procedure 3: Accumulative Double Correlator FSM

42:      end if
43:  end procedure

Simulation Results

The relative performance of embodiments using a range of different correlator thresholds were evaluated in Matlab simulations. The different threshold values in FIGS. 8 & 9 are the values of the threshold A, but in the simulations the threshold D was also varied, by setting D=A−0.03.

Figure 8:
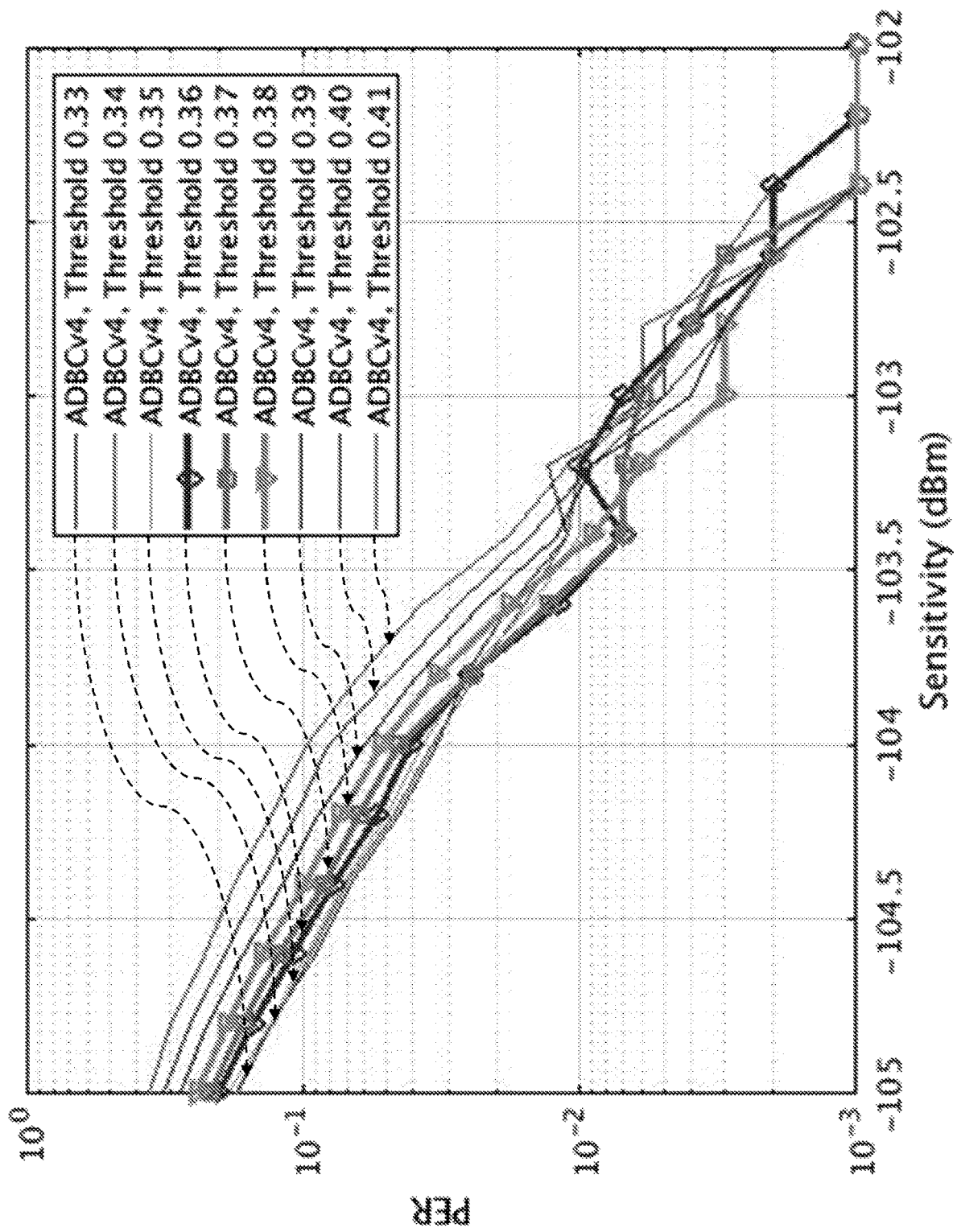
FIG. 8 is a plot of packet error rate (PER) against sensitivity for simulations of embodiments using different correlation thresholds.

FIG. 8 shows the sensitivity performance. It simulates the packet error rate (PER) performance with sensitivity from −105 dBm to −85 dBm. According to the simulation, −103 dBm sensitivity should be achievable with 0.01 packet error rate level by lowering the DBC threshold down to around 0.37, and no error floor is observed in high SNR region.

Figure 9:
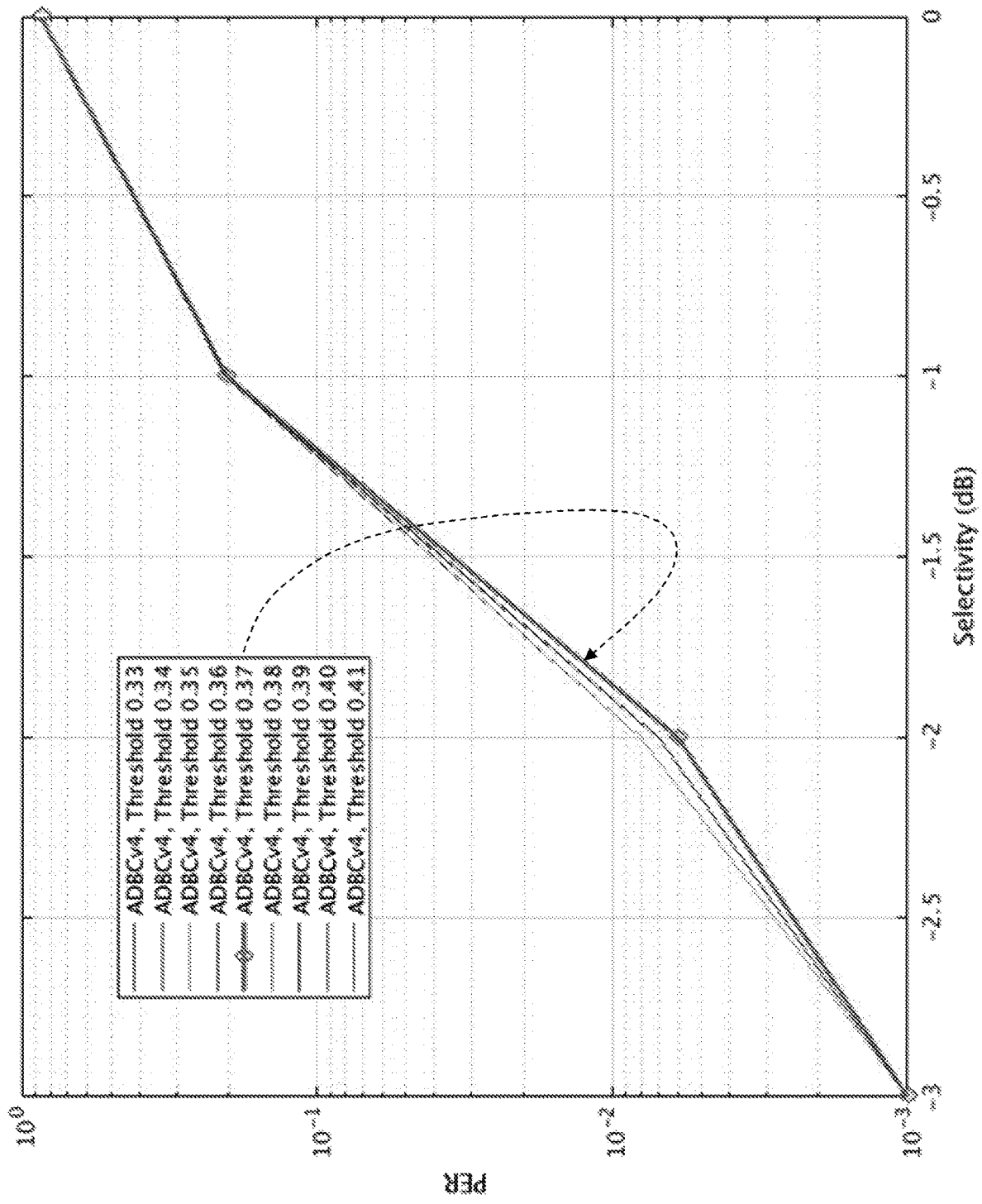
FIG. 9 is a plot of packet error rate (PER) against selectivity for simulations of embodiments using different correlation thresholds.

FIG. 9 shows the selectivity performance. Performance was simulated with a selectivity level from 0 to −20 dB. According to the simulation, the receiver 9 should achieve around −2 dB selectivity performance at 0.01 PER when the DBC threshold is 0.37.

The approach described herein has thus been shown to provide good performance by exploiting the long repeating preamble to obtain symbol timing and frequency-offset estimates accurately and reliably.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio apparatus-configured: comprising:
a radio receiver;
a memory;
a hardware correlator; and
synchronization and decoding logic,
wherein the radio receiver is configured to:
receive a radio-frequency signal as a radio signal, wherein the radio-frequency signal encodes a data frame having a synchronization preamble comprising a plurality of instances of a predetermined synchronization sequence; and
generate signal data representing the received radio-frequency signal from the received radio signal while the radio receiver is receiving the radio signal;
wherein the memory is configured to store synchronization data representing the predetermined synchronization sequence;
wherein the hardware correlator is configured to correlate signal data representing the synchronization preamble with the stored synchronization data to generate synchronization correlation data; and
wherein the synchronization and decoding logic is configured,
while generating the synchronization correlation data, to:
identify a first set of one or more peaks in the synchronization correlation data;
determine first synchronization information for the radio apparatus from the first set of one or more peaks; and
synchronize the receiving, by the radio apparatus, of at least a first part of the radio-frequency signal using the first synchronization information; and
wherein the synchronization and decoding logic is configured, after generating more of the synchronization correlation data, to:
identify a second set of one or more peaks in the synchronization correlation data;
determine second synchronization information for the radio apparatus from the second set of one or more peaks; and
synchronize the receiving, by the radio apparatus, of at least a second part of the radio-frequency signal using the second synchronization information.

2. The radio apparatus of claim 1, wherein the first synchronization information comprises symbol timing information.

3. The radio apparatus of claim 1, wherein the first synchronization information comprises a frequency offset estimate.

4. The radio apparatus of claim 1, wherein the second synchronization information comprises symbol timing information.

5. The radio apparatus of claim 1, wherein the second synchronization information comprises a frequency offset estimate.

6. The radio apparatus of claim 1, wherein the radio apparatus is configured to determine the first and second synchronization information while the radio apparatus is generating the synchronization correlation data from the signal data representing the synchronization preamble.

7. The radio apparatus of claim 1, wherein the radio apparatus is configured to use the first synchronization information for synchronizing the receiving, by the radio apparatus, of at least a first part of the synchronization preamble of the radio-frequency signal, and to use the second synchronization information for synchronizing the receiving, by the radio apparatus, of at least a second part of the synchronization preamble of the radio-frequency signal.

8. The radio apparatus of claim 1, further comprising a symbol detector for detecting symbols from the signal data, and wherein the radio apparatus is configured to use at least the first synchronization information or the second synchronization information to synchronize the symbol detector.

9. The radio apparatus of claim 1, wherein the radio apparatus is configured to accumulate frequency-synchronization information determined from respective sets of one or more peaks, and to use the accumulated information for synchronizing the receiving, by the radio receiver, of at least part of the radio-frequency signal.

10. The radio apparatus of claim 9, wherein the radio apparatus is configured to determine an averaged frequency offset estimate as a coherent average of a plurality of frequency-offset estimates, determined from respective peaks in the synchronization correlation data, and to use the averaged frequency offset estimate for synchronizing the receiving, by the radio apparatus, of at least part of the radio-frequency signal.

11. The radio apparatus of claim 1, wherein the radio apparatus is configured to select frequency-synchronization information, determined from one peak or from one set of peaks, from a larger quantity of frequency-synchronization information determined from a plurality of respective peaks or respective sets of peaks, and to use the selected frequency offset estimate for synchronizing the receiving, by the radio apparatus, of at least part of the radio-frequency signal.

12. The radio apparatus of claim 1, wherein the radio apparatus is configured to determine whether later-determined synchronization information is to replace earlier-determined synchronization information, and, if the radio apparatus determines that the later-determined synchronization information should replace the earlier-determined synchronization information, to use the later-determined synchronization information for synchronizing the receiving, by the radio apparatus, of at least part of the radio-frequency signal, and, if it determines that the later-determined synchronization information should not replace the earlier-determined synchronization information, to discard the later-determined synchronization information or to accumulate the later-determined synchronization information with the earlier-determined information.

13. The radio apparatus of claim 1, wherein the radio apparatus is configured to detect peaks within the synchronization correlation data as the synchronization correlation data is generated, and to determine respective updated synchronization information in response to detecting a new peak in the synchronization correlation data, for at least one or more peaks.

14. The radio apparatus of claim 1, configured to identify each of the sets of one or more peaks by performing a peak-analysis process on the synchronization correlation data, wherein the peak-analysis process comprises determining whether a new peak satisfies a qualifying condition for inclusion in a set of one or more peaks for determining synchronization information for the radio apparatus.

15. The radio apparatus of claim 14, wherein the qualifying condition comprises a magnitude condition that requires a peak to be associated with a correlation value, in the synchronization correlation data, having a magnitude greater than a threshold.

16. The radio apparatus of claim 14, wherein the qualifying condition comprises a timing condition that requires a peak, in the synchronization correlation data, to be separated from an earlier peak by a time interval that corresponds to the duration of the predetermined synchronization sequence.

17. The radio apparatus of claim 14, wherein the radio apparatus comprises a symbol detector, and wherein the qualifying condition comprises a symbol-detection condition, and the peak-analysis process comprises using the symbol detector to determine whether a peak, in the synchronization correlation data, is consistent with a symbol of the predetermined synchronization sequence.

18. A method of synchronizing a radio apparatus comprising a radio receiver, a hardware correlator, a memory, and synchronization and decoding logic, the method comprising:
correlating signal data with synchronization data stored in the memory, using the hardware correlator, to generate synchronization correlation data, wherein the signal data represents a radio-frequency signal, received by the radio receiver, that encodes a data frame having a synchronization preamble comprising a plurality of instances of a predetermined synchronization sequence, wherein the stored synchronization data represents the predetermined synchronization sequence, and wherein the synchronization correlation data is generated by correlating signal data representing the synchronization preamble with the stored synchronization data;
while generating the synchronization correlation data, using the synchronization and decoding logic for:
identifying a first set of one or more peaks in the synchronization correlation data;
determining first synchronization information for the radio apparatus from the first set of one or more peaks; and
synchronizing the receiving, by the radio apparatus, of at least a first part of the radio-frequency signal using the first synchronization information; and
after generating more of the synchronization correlation data, using the synchronization and decoding logic for:
identifying a second set of one or more peaks in the synchronization correlation data;
determining second synchronization information for the radio apparatus from the second set of one or more peaks; and
synchronizing the receiving, by the radio apparatus, of at least a second part of the radio-frequency signal using the second synchronization information.

19. The method of claim 18, wherein:
the first synchronization information comprises timing-synchronization information;
the second synchronization information comprises frequency-synchronization information; and
the first set of peaks contains fewer peaks than the second set of peaks.

* * * * *